United States Patent [19]

Suttles

[11] Patent Number: 4,518,279
[45] Date of Patent: May 21, 1985

[54] BASE ELEMENT CONNECTION FOR SHEET METAL FURNITURE

[75] Inventor: James M. Suttles, Elberton, Ga.

[73] Assignee: The Mead Corporation, Atlanta, Ga.

[21] Appl. No.: 536,265

[22] Filed: Sep. 27, 1983

[51] Int. Cl.³ .................. E04H 12/06; A47F 5/10
[52] U.S. Cl. .................... 403/231; 403/217;
403/403; 211/189; 211/191; 52/721; 5/294;
5/296
[58] Field of Search .............. 403/217, 219, 403, 405,
403/170, 171, 231; 211/189, 191, 206, 186;
5/288, 289, 290, 291, 292, 294, 296; 52/721,
648; 108/107, 106

[56] References Cited

U.S. PATENT DOCUMENTS

| | | | |
|---|---|---|---|
| 1,919,780 | 7/1934 | Fairbank | 403/231 |
| 1,972,108 | 9/1934 | Richardson | 5/294 |
| 3,237,779 | 3/1964 | Eger | 211/191 |
| 4,155,131 | 5/1979 | Harris et al. | 5/296 |
| 4,351,244 | 9/1982 | Suttles | 108/107 |
| 4,421,239 | 12/1983 | Vargo | 403/405 X |

FOREIGN PATENT DOCUMENTS 20198  5/1930  Australia .................. 5/288

Primary Examiner—Cornelius J. Husar
Assistant Examiner—Todd G. Williams
Attorney, Agent, or Firm—Howson and Howson

[57] ABSTRACT

A fastener-free merchandising display stand, which is rigid when initially assembled, and which remains rigid during use, comprises interconnected perpendicular base panels which meet at a sheet metal upright. One of the panels is rigidly welded to the upright, while the other panel is connectable to the first panel and the upright by sliding it vertically downwardly into a pocket formed by a section of the post and a section of the first panel extending perpendicularly from the face thereof and having an oblique, flanged edge. The second panel has a flange with an oblique edge which fits into the pocket. The second panel is tightened against the upright as it slides downwardly by a wedging action, so that the weight of the second panel tends to cause the interconnection to remain tight even if a slight bending of sheet metal parts takes place as a result of abuse.

4 Claims, 3 Drawing Figures

BASE ELEMENT CONNECTION FOR SHEET METAL FURNITURE

BRIEF SUMMARY OF THE INVENTION

This invention relates to an improved mechanical connection between perpendicular base panels of an article of sheet metal furniture. The invention has utility in various articles of sheet metal furniture, and particularly in soft drink display stands of the type used for merchandising soft drinks in supermarkets, grocery stored and the like.

In the past, much effort has been expended in the development of fastener-free sheet metal furniture, and particularly fastener-free display stands. The ability to assemble a display stand rapidly and without the need for fasteners in an important objective because these stands are usually shipped to the supermarkets in parts and assembled by supermarket personnel who may have little, if any, experience in the assembly of sheet metal furniture.

While the ability to assemble sheet metal display stands without the need for fasteners is highly desirable from the standpoint of simplicity, strength and rigidity tend to suffer somewhat in fastener-free stands. My U.S. Pat. No. 4,351,244, issued Sept. 28, 1982, describes a fastener-free base connection for a soft drink display stand which embodies a partial solution to the problems of strength and rigidity in that it provides a rigid connection between perpendicular base panels of the display stand. In accordance with the patent, a first panel is permanently connected to an upright, and is configured so that it has a flange which extends obliquely toward a corner formed in the upright. This oblique flange bears against a corner formed by the other base panel and one of its flanges, and urges the latter panel and its flange tightly against the upright. The base connection of my patent provides a rigid assembly initially, but, under conditions of abuse, the base connection can work loose because the parts of the interconnecting elements tend to bend.

It is an object of this invention to provide a rigid, fastener-free base element connection which is structurally simple, which is easy to assemble, which is rigid when initially assembled, and which remains rigid even under conditions of abuse.

The foregoing objectives are achieved in accordance with the invention by attaching one of two base panels to be interconnected rigidly to an upright post, and providing both panels with interconnecting flanges which are wedge-shaped so that, when they interact with each other, the panel which is not rigidly attached to the post is cammed toward the post tightly as it slides downwardly. Thus, the weight of the panel tends to tighten its connection to the post and to the other panel throughout the useful life of the device.

Other objects of the invention will become apparent from the following detailed description when read in conjunction with the drawings.

DETAILED DESCRIPTION

Figure 1:
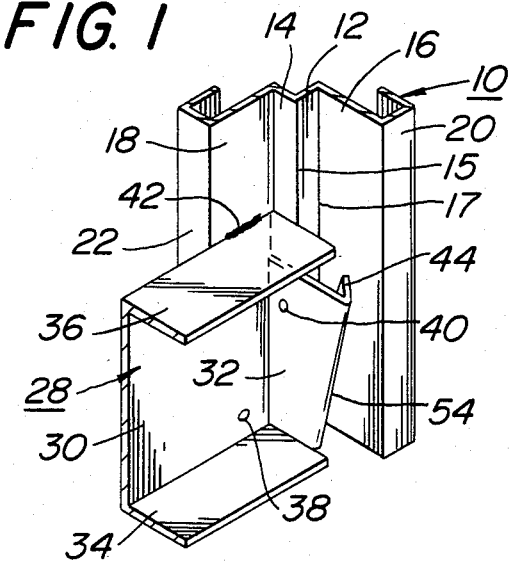
FIG. 1 is a perspective view illustrating a portion of a first panel rigidly connected by welding to the lower end of an upright post at the corner of a sheet metal display stand.

FIG. 1 shows an upright post 10 having a generally W-shaped configuration. The post comprises a first, vertically elongated planar post section 12, and a second, vertically elongated, planar post section 14, these two sections meeting each other along a vertical corner line 15. A third vertically elongated planar post section 16 meets section 12 along a vertical corner line 17. Sections 14 and 16 are both perpendicular to section 12, and are located on opposite sides of the plane of section 12.

A fourth vertically elongated planar post section 18 extends perpendicularly from post section 14 to complete the W-shaped configuration. In addition to these sections, the post also has sections 20 and 22 and flanges 24 and 26, which provide for reinforcement and serve as retainers for flexible trim strips (not shown). For a disclosure of the flexible trim strip, and the overall configuration of a typical merchandising unit using this type of post configuration, reference should be made to my U.S. Pat. No. 4,351,244, issued Sept. 28, 1982. The entire disclosure of that patent is here incorporated by reference.

A first panel 28 is rigidly attached to the post by welding. Panel 28 comprises a first and main panel section 30 which may be a side panel or a front or rear panel of the base of a display stand. It also comprises a second panel section 32 which is unitary with and extends perpendicularly from panel section 30. Lower and upper inwardly extending flanges are provided respectively at 34 and 36. Typically, lower flange 34 rests on a floor, while the upper flange serves as a reinforcement and as a part of a base shelf. Panel section 30 is welded to post section 18 at 38, and panel section 32 is welded to post section 14 at 40. An additional weld may be provided at 42 to secure the upper part of panel section 30, where it meets flange 36, to post section 18.

Panel section 32 extends in parallel to post section 16, and is spaced therefrom to provide a pocket for receiving a second panel. A flange 44 extends into this space and toward post section 16.

A second panel 46 comprises a third panel section 48, which is the main panel section, a fourth panel section 50, which extends perpendicularly from panel section 48, and a fifth panel section 52, which is in the nature of a return flange, extending in parallel to, but spaced from, panel section 48. Second panel section 32 and fifth panel section 52 are both wedge-shaped, being narrower at their lower ends than at their upper ends. Edge 54, where panel section 32 meets flange 44, is oblique, as is edge 56 of fifth panel section 32. Edges 54 and 56 conform to each other.

Figure 3:
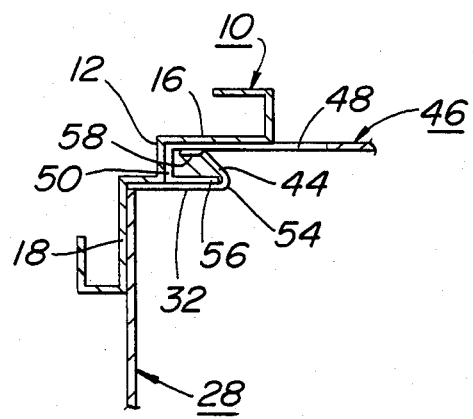
FIG. 3 is a horizontal section through a corner a display stand, showing the manner in which the panels are connected to each other and to the upright post.
Figure 2:
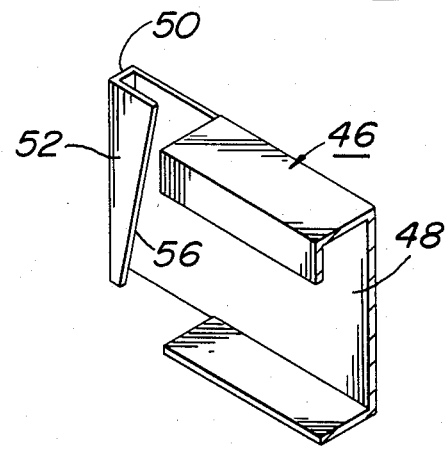
FIG. 2 is a perspective of part of a second panel connectable to the assembly of FIG. 1.

Panel 46 fits the assembly comprising post 10 and panel 28 in the manner depicted in FIG. 3. The engagement of edge 56 with the corner formed by panel 32 and flange 44 urges fourth panel section 50 against post section 12 as panel 46 is moved downwardly. the dimensions of fifth panel section 52, and the relationship between edges 54 and post section 12 are chosen so that tight engagement between panel section 50 and post section 12 takes place before panel 46 reaches the floor on which the assembly rests. Therefore, as panel 46 slides downwardly, a tight relationship between the panel and the assembly of FIG. 1 is effected. Furthermore, by virtue of the wedging action of the wedge-shaped panel sections, the weight of panel 46 constantly effects a tightening action so that, even if the parts become loose by reason of rough handling or other abuse, they will retighten automatically.

As shown in FIG. 3, edge 58 of flange 44 is oblique, and is positioned so that it bears against third panel section 48, urging it against third post section 16, preferably by a spring action. The oblique line engagement between edge 58 of flange 44 and panel 48 tends to resist rotational movement of panel 46 about a vertical axis.

The other three corners of the display stand may be constructed similarly.

As will be apparent from the foregoing, the invention provides a very rigid, fastener-free connection between base panels. The assembly is structurally simple, and is easy to put together, particularly in that the wedge-shaped configuration of the mating parts makes it easy to slide panel sections 50 and 52 downwardly into the pocket formed between panel section 32 and post section 16. Initial tightening may be effected simply by pushing down on panel section 46, and the weight of panel section 46 thereafter maintains a tight engagement of parts at the corners of the display stand.

The principles of the invention are applicable to many articles of sheet metal furniture, including display stands, merchandisers, gondolas and the like, and various departures may be taken from the exact nature and configuration of parts described herein.

I claim:

1. In an article of sheet metal furniture, such as a merchandising display stand, comprising a sheet metal upright post, and first and second sheet metal panels meeting the post at right angles to each other, an improved structure wherein:

the upright post comprises a sheet of metal formed into a horizontal cross-sectional configuration having first and second vertically elongated planar sections meeting each other at right angles along a first vertical corner line, and a third vertically elongated planar section meeting the first section along a second vertical corner line spaced from the first vertical line, the second and third sections being on opposite sides of the plane of the first section;

the first panel is rigidly attached to the upright post and comprises a first panel section meeting the second section of the post perpendicularly at a location spaced from the first corner line, and a second panel section unitary with the first panel section and extending perpendicularly from the end of the first panel section, along the second section of the post, and past the first vertical corner line so that a portion of the third section of the post and a portion of the second panel section are positioned opposite and parallel to each other, the second panel section having an edge remote from the intersection of the first and second panel sections, said edge being oblique in a vertical plane with the distance between its lower end and said intersection being less than the distance between its upper end and said intersection, said second panel section having a flange along said oblique edge, said flange being unitary with the second panel section, meeting the second panel section along an oblique line of intersection, and extending toward the space between the second panel section and the third section of the post; and the second panel comprises a third panel section extending parallel to the third section of the post and into the space between the third section of the post and said second panel section, said third panel section lying against the third section of the post and having an edge meeting said first panel section, a fourth panel section, unitary with the third panel section, and extending perpendicularly from said edge of the third panel section, lying against said first section of the post and extending to and meeting the second panel section, and a fifth panel section, unitary with the fourth panel section, extending perpendicularly from the fourth panel section and lying against the second panel section, the fifth panel section having an oblique edge in a vertical plane, said oblique edge conforming to the line of intersection between the second panel section and its flange;

whereby a downward force on the second panel causes the oblique edge of the fifth panel section, in cooperation with the line of intersection between the second panel section and its flange, to effect tightening of the fourth panel section against the first section of the post.

2. A structure according to claim 1 in which the flange extends toward the third section of the post and contacts the third panel section, holding the third panel section against the third section of the post.

3. A structure according to claim 2 in which the flange contacts the third panel section along an oblique line lying in a vertical plane.

4. A structure according to claim 2 in which the flange forms an acute angle with the second panel section.

* * * * *

UNITED STATES PATENT AND TRADEMARK OFFICE
CERTIFICATE OF CORRECTION

PATENT NO. : 4,518,279
DATED : May 21, 1985
INVENTOR(S) : James M. Suttles

It is certified that error appears in the above–identified patent and that said Letters Patent are hereby corrected as shown below:

Column 1, line 12, "stored" should be --stores--;

Column 2, line 55, "32" should be --52--; and

Column 2, line 61, "the" should be --The--.

Signed and Sealed this

Twenty-second Day of October 1985

[SEAL]

Attest:

DONALD J. QUIGG

Attesting Officer

Commissioner of Patents and Trademarks—Designate